US006860404B2

(12) United States Patent
Duqueroie

(10) Patent No.: US 6,860,404 B2
(45) Date of Patent: Mar. 1, 2005

(54) DEVICE AND METHOD FOR DISPENSING A FLUID PRODUCT

(75) Inventor: Florent Duqueroie, Paris (FR)

(73) Assignee: L'Oreal S.A., Paris (FR)

( * ) Notice: Subject to any disclaimer, the term of this patent is extended or adjusted under 35 U.S.C. 154(b) by 43 days.

(21) Appl. No.: 10/201,985

(22) Filed: Jul. 25, 2002

(65) Prior Publication Data

US 2003/0075554 A1 Apr. 24, 2003

(30) Foreign Application Priority Data

Jul. 25, 2001 (FR) ............................................ 01 09932

(51) Int. Cl.[7] ................................................ G01F 11/00

(52) U.S. Cl. ........................... 222/1; 222/633; 222/211; 222/212

(58) Field of Search ............................ 222/1, 156, 211, 222/212, 631–634; 239/327

(56) References Cited

U.S. PATENT DOCUMENTS

| | | | | | |
|---|---|---|---|---|---|
| 2,500,639 | A | * | 3/1950 | Lermer | 222/215 |
| 2,571,504 | A | | 10/1951 | Vuillemenot | 299/90 |
| 2,642,313 | A | | 6/1953 | Montenier | 299/90 |
| 2,728,981 | A | | 1/1956 | Hooper | 29/525 |
| 3,412,907 | A | | 11/1968 | Faso | 222/187 |
| 3,583,602 | A | | 6/1971 | Gruber | 222/92 |
| 3,897,005 | A | | 7/1975 | Reiner | 239/327 |
| 3,937,364 | A | * | 2/1976 | Wright | 222/190 |
| 4,014,468 | A | * | 3/1977 | Silverman et al. | 239/327 |
| 4,239,132 | A | * | 12/1980 | Mueller et al. | 222/212 |
| 4,275,840 | A | | 6/1981 | Staar | 239/327 |
| 4,415,122 | A | * | 11/1983 | Laauwe | 239/327 |
| 5,129,550 | A | | 7/1992 | Eschbach | 222/135 |
| 5,301,840 | A | * | 4/1994 | Sun | 222/109 |
| 6,460,781 | B1 | * | 10/2002 | Garcia et al. | 239/327 |
| 6,644,505 | B2 | * | 11/2003 | Davidian | 222/1 |
| 6,679,439 | B2 | * | 1/2004 | Duqueroie | 239/327 |
| 6,715,697 | B2 | * | 4/2004 | Duqueroie | 239/327 |

FOREIGN PATENT DOCUMENTS

| | | |
|---|---|---|
| BE | 870 592 | 1/1979 |
| DE | 1 081 613 | 5/1960 |
| DE | 2 035 586 | 1/1972 |
| EP | 0 761 314 | 3/1997 |
| FR | 2 443 980 | 7/1980 |
| FR | 2 778 639 | 11/1999 |
| GB | 263 699 | 1/1927 |
| GB | 680 815 | 10/1952 |
| WO | WO 99/59881 | 11/1999 |
| WO | WO 01/81184 | 11/2001 |

OTHER PUBLICATIONS

Notice of Allowance and Fee(s) Due mailed by the USPTO on Sep. 16, 2003, in co–pending U.S. Appl. No. 10/177,135.
Request for Reconsideration filed Sep. 2, 2003, in co–pending U.S. Appl. No. 10/177,135.

(List continued on next page.)

*Primary Examiner*—Joseph A. Kaufman
(74) *Attorney, Agent, or Firm*—Finnegan, Henderson, Farabow, Garrett & Dunner, LLP

(57) ABSTRACT

A device for dispensing a fluid product includes a reservoir configured to contain a fluid product and air, a spray orifice associated with the reservoir, and a dip tube. The reservoir may include at least one deformable zone having a predetermined threshold resistance to deformation. The deformable zone may be configured to deform in response to pressure exerted on the deformable zone so as to cause the product to be sprayed out from the orifice. When pressure exerted on the deformable zone is less than a threshold pressure $P_s$ sufficient to overcome the predetermined threshold resistance to deformation of the deformable zone, the internal volume of the reservoir is not substantially reduced.

47 Claims, 3 Drawing Sheets

OTHER PUBLICATIONS

Office Action mailed by the USPTO on May 30, 2003, in co–pending U.S. Appl. No. 10/177,135.

Amendment filed Mar. 24, 2003, in co–pending U.S. Appl. No. 10/177,135.

Office Action mailed by the USPTO on Dec. 26, 2002, in co–pending U.S. Appl. No. 10/177,135.

Notice of Allowance and Fee(s) Due mailed by the USPTO, dated Aug. 27, 2003, in co–pending U.S. Appl. No. 10/177, 141.

Request for Reconsideration filed Aug. 12, 2003, in co–pending U.S. Appl. No. 10/177,141.

Final Office Action mailed by the USPTO on May 12, 2003, in co–pending U.S. Appl. No. 10/177,141.

Amendment filed Mar. 26, 2003, in co–pending U.S. Appl. No. 10/177,141.

Office Action mailed by the USPTO on Feb. 3, 2003, in co–pending U.S. Appl. No. 10/177,141.

Co–pending U.S. Appl. No. 10/177,141; Title: Device for Dispensing a Fluid Product and Method of Dispensing a Fluid Product Inventor(s): Florent Duqueroie U.S. Filing Date: Jun. 24, 2002.

Co–pending U.S. Appl. No. 10/177,135; Title: Device for Dispensing a Fluid Product Inventor(s): Florent Duqueroie and Method of Dispensing a Fluid Product U.S. Filing Date: Jun. 24, 2002.

English language Derwent Abstract of BE 870 592, Jan. 15, 1979.

English language Derwent Abstract of DE 20 35 586, Jan. 20, 1972.

English language Derwent Abstract of EP 0 761 314, Mar. 12, 1997.

English language Derwent Abstract of FR 2 778 639, Nov. 19, 1999.

* cited by examiner

Fig. 1
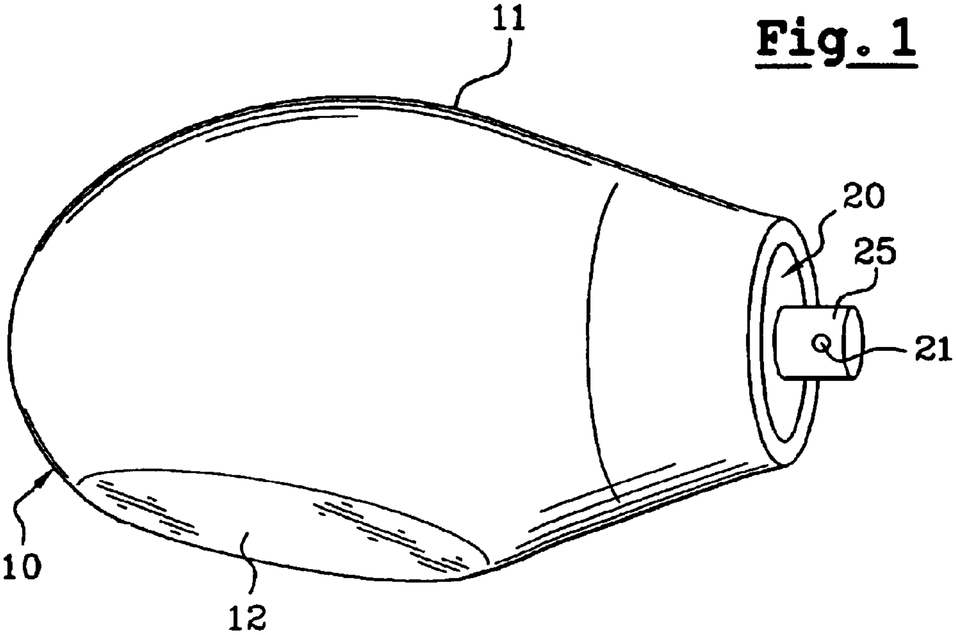
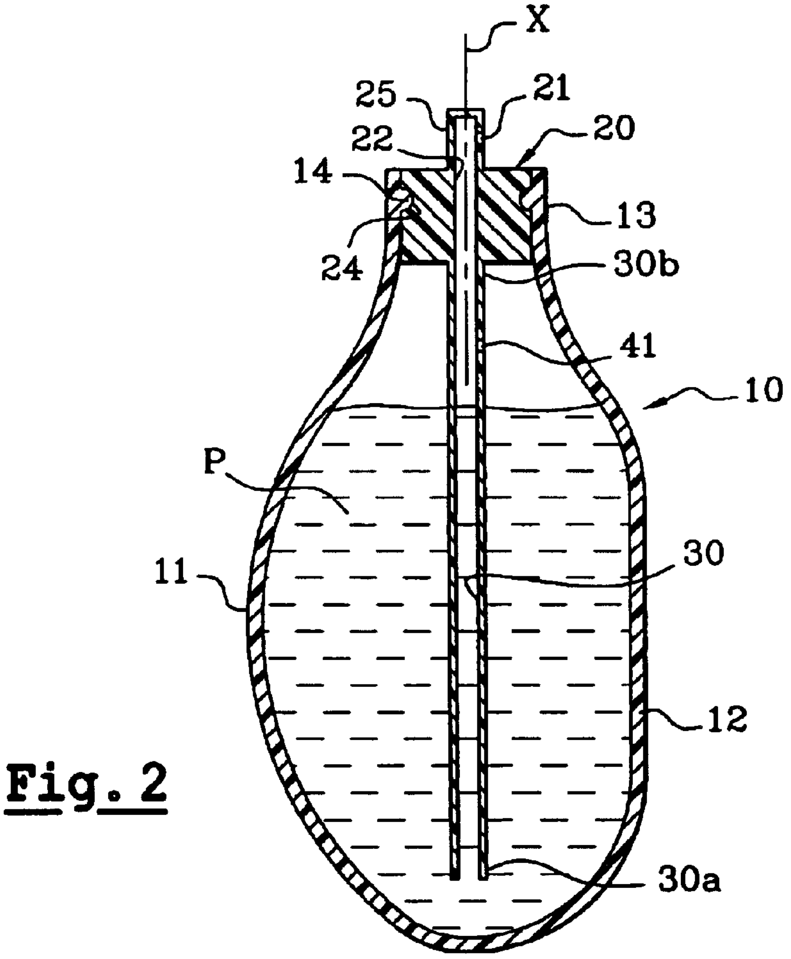
Fig. 2

Fig. 4
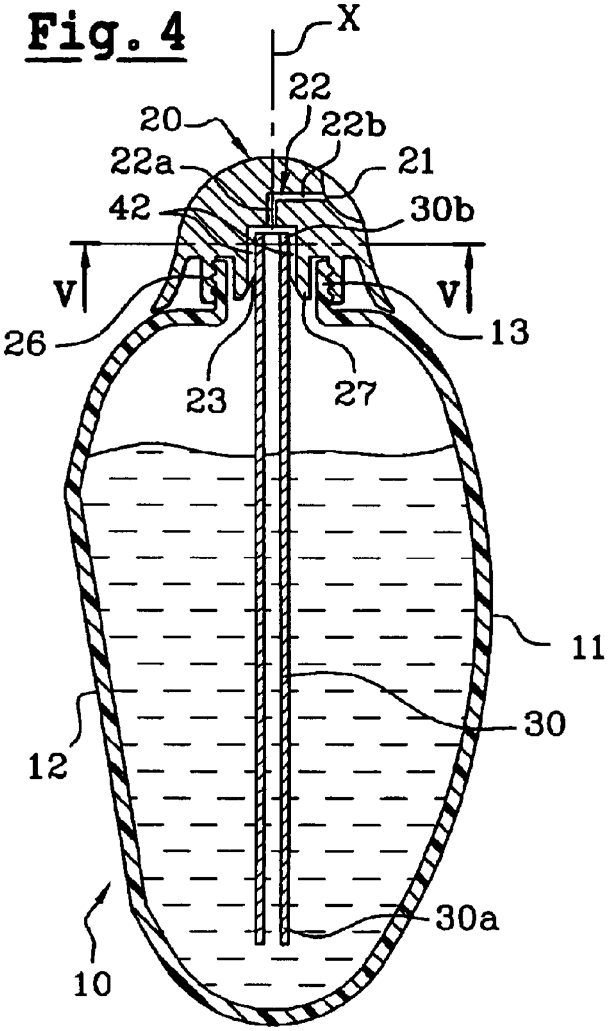
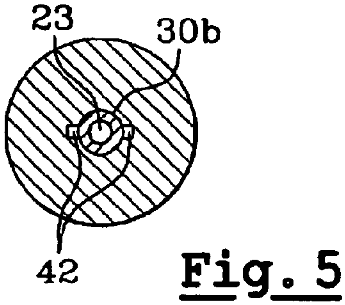
Fig. 5
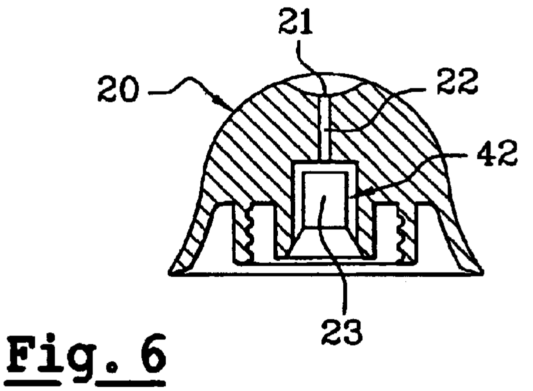
Fig. 6

DEVICE AND METHOD FOR DISPENSING A FLUID PRODUCT

BACKGROUND OF THE INVENTION

1. Field of the Invention

The present invention relates to a device for dispensing a product, for example, a fluid product, in the form of a spray. In one example, the device could be a miniature device configured to dispense a spray of one or more cosmetic products and/or care products, for example, a product comprising at least one substance for imparting a scent.

2. Description of the Related Art

Examples of some dispensers are generally described in the following patent applications: FR-A-2 778 639, EP-A-0 761 314, and FR-A-2 443 980; and in U.S. Pat. Nos. 3,897,005, and 3,412,907. These devices generally suffer from at least one principal drawback, such as, for example, cost of manufacture, difficulty to use, or inability to generate a quality spray.

For example, for dispensers that contain samples of products that are generally not intended for sale, it is sometimes desired to keep the cost of manufacture as low as possible. In such dispensers, it may be important for the devices to include parts which can be produced easily by mass production and which can be assembled in a simple manner. Furthermore, it is sometimes desired for dispensers to be capable of generating a spray possessing good quality and consistent characteristics. It may also be desired for dispensers to generate a relatively gentle spray for a certain duration, so that the spray may possess characteristics similar to the spray of an aerosol-type spray.

One solution for producing dispensers at a lower cost might include producing a reservoir in the form of a dosing bottle, for example, a dosing bottle of the type sometimes used for dispensing some physiological serums, eye ointments, and/or makeup removing products. Such a dosing bottle may be formed in a single piece, for example, with a spray orifice which may be opened by pulling off an endpiece (e.g., by twisting the endpiece off about the axis of the spray orifice). Such a dispenser may be filled via an open bottom in the reservoir. The open bottom may then be sealed, for example, by welding in a manner similar to welding the end of a tube.

Such a solution may, however, suffer-from two major drawbacks. A first drawback may arise from the fact that upon opening, the spray orifice resulting from pulling-off the endpiece (e.g., by twisting) may have an imprecise shape and size. This may result in the spray characteristic varying greatly from one device to another when compressible walls of the reservoir are pressed to initiate spraying. In some instances, the cross-section of the orifice may be such that it is not possible to generate a spray. In such instances, the product may be able to flow out of the dispensing orifice only in the form of droplets of a greater or lesser size, or in the form of a continuous stream, rather than in the form of a spray.

A second drawback may be found, for example, in the welding operation. For example, in a dispenser containing a highly volatile product such as a scent, there is a risk that the product will evaporate when subjected to the heat associated with a welding process. The product may even deteriorate or ignite.

Examples of dispensers that attempt other solutions are described in U.S. Pat. Nos. 2,571,504, 2,642,313, and 2,728, 981; and in British patent document Nos. 680 815 and 263 699. These devices include a container having a squeezable wall containing a liquid product for being expelled via a conduit through an outlet. In these devices, deformation of the squeezable wall is substantially linear (i.e., the reduction in the internal volume of the container varies in a substantially proportional manner to the pressure exerted on the squeezable wall to deform the container). As a result, the user may initiate deformation of the squeezable wall by exerting only a relatively light pressure on the wall, which may result in only slightly compressing the air in the container. This may provide energy to the air that is insufficient to drive a portion of the product into a conduit. As a result of only slightly compressing the air in the container, a small portion of air may have a tendency to escape from the container without any of the product, or at least an insufficient amount of the product, being sprayed.

One subject of the invention relates to a dispenser, for example, a spray device, which may fully or partly obviate one or more drawbacks associated with the related art. Another subject of the invention relates a device which may be easy to mass-produce in a cost-effective manner. Another subject of the invention concerns a device for dispensing which may render it possible to generate a spray of satisfactory quality which may be consistently reproducible from one device to another. A further subject of the invention pertains to a device that may be capable of generating spray for a certain duration, and that may be capable of obtaining a relatively gentle spray. These subjects are optional and exemplary. Other subjects might also be possible.

SUMMARY OF THE INVENTION

In the following description, certain aspects and embodiments will become evident. It should be understood that the invention, in its broadest sense, could be practiced without having one or more features of these aspects and embodiments. It should also be understood that these aspects and embodiments are merely exemplary.

In one aspect, as embodied and broadly described herein, the invention includes a device for dispensing a fluid product. The device includes a reservoir configured to contain a fluid product and air. The reservoir may define an internal volume and may include at least one deformable zone having a predetermined threshold resistance to deformation. The device may include a spray orifice and a dip tube. The dip tube may include a first end located adjacent a bottom of the reservoir, and a second end that is in flow communication with the spray orifice. The deformable zone may be configured to deform in response to pressure exerted on the deformable zone so as to cause the product to be sprayed out from the orifice, and may be configured so that when pressure exerted on the deformable zone is less than a threshold pressure $P_s$ sufficient to overcome the predetermined threshold resistance to deformation of the deformable zone, the internal volume of the reservoir is not substantially reduced.

As used herein, a deformable zone having a "threshold resistance to deformation" means a zone (e.g., wall and/or wall portion) configured in such a way that its deformation does not depend linearly on the pressure exerted on it in order to deform it, but entails the passing of a threshold. Thus, pressure exerted by a user on the deformable zone before the threshold pressure $P_s$ (i.e., the pressure necessary and sufficient to overcome the predetermined threshold resistance to deformation of the deformable zone) is reached, may cause some deformation of the deformable zone which does not make it possible to significantly reduce the interior volume of the reservoir, but which does allow energy to be built up so that when the pressure exerted by the user on the deformable zone reaches the threshold pressure $P_s$, the deformable zone deforms suddenly. The volume inside the reservoir is then reduced in such a way that an overpressure is suddenly created inside the reservoir. This overpressure allows the product to be driven into the dip tube with enough energy to cause it to travel up as far as the spray orifice so as to generate, in at least some embodiments, a good quality spray.

At least some embodiments may be configured so the product (e.g., liquid) "sprayed" out from the orifice is ejected and/or dispersed in the form of a mass or cloud of droplets, or in a discontinuous stream of droplets, such as, for example, in an atomizing fashion where the substance is in the form of a fine mist of tiny particles and/or droplets. In one example, the "spray" could be in a form similar to that of perfume dispensed in small particles dispersed in the air. In another example, the "spray" could be in a form similar to that sometimes associated with aerosol dispensers.

According to another aspect, the device may include an air passage configured to permit at least a portion of the air in the reservoir to mix, adjacent the second end of the dip tube, with product conveyed by the dip tube. In yet an additional aspect, the device may include a duct, wherein the second end of the dip tube is in flow communication with the spray orifice via the duct.

In still another aspect, the device may include a dispensing end-piece attached to the reservoir, wherein the dispensing end-piece includes the spray orifice and the duct. The dispensing end-piece may define a cavity and the second end of the dip tube may be fixedly mounted in the cavity by being, for example, forcibly inserted. In a further aspect, the dip tube and the dispensing end-piece may be unitarily formed. In such an embodiment, the device may include two main parts, which may render the device more simple to produce by forming, for example, a reservoir along with an end-piece that may serve as a stopper in addition to providing a spray orifice.

According to yet another aspect, the device may include an air passage formed in the dispensing end-piece. The air passage may open into the duct and the reservoir. In another aspect, the air passage may open into the duct at the second end of the dip tube. In a further aspect, the dispensing end-piece may be attached to the reservoir and define a cavity wall. The air passage may include at least one groove formed in the cavity wall. In yet an additional aspect, the air passage may be defined by an orifice provided in a lateral wall of the dip tube adjacent to the second end of the dip tube.

In still a further aspect, the dip tube may define an axis and the spray orifice may be formed along the axis. In another aspect, the spray orifice may be angularly offset from the axis, and the device may be used in an upright orientation, for example, with the dip tube in a roughly vertical orientation. It may be possible in such an orientation to obtain a spray that is not vertical, for example, a horizontal spray, which may render the product easier to apply to the skin by providing a spray orifice which is offset with respect to the axis of the dip tube (e.g., offset by 90° with respect to the axis of the dip tube).

According to yet another aspect, the deformable zone may be configured to revert to its initial shape via elastic return (e.g., have shape memory) when the pressure exerted on the deformable zone ceases. This may enable the device to be used several times in succession. For example, the deformable zone may be configured to be deformed from an undeformed position to a deformed position, and may be provided with a substantially convex profile (e.g., in the form of a dome) in its undeformed position and a substantially concave profile in its deformed position. The deformed position may occur when the pressure exerted on the deformable zone reaches the threshold pressure $P_s$. Such a configuration may render it possible to more easily obtain a deformable zone having a threshold resistance to deformation which substantially corresponds to the change between the concave profile and the convex profile. This configuration may also encourage the deformable zone to return to the convex position when the pressure ceases.

In still another aspect, the deformable zone of the reservoir may be formed of thermoplastic material. For example, the thermoplastic material may be selected from polyethylenes, polypropylenes, polyethylene terephthalates, polyethylene naphthalates, polyacrylonitriles, polyoxymethylenes, and polyvinyl chlorides.

In another aspect, the device of may be configured to contain a sample dose of fluid product, and the device may further include the fluid product contained in the reservoir. For example, at least prior to a first use of the device, the product may have a volume ranging from about 0.5 milliliter to about 15 milliliters. The product may include at least one of a cosmetic product and a care product and such a product may have a volume that is a sample dose. For example, the product may include at least one component imparting a scent to the product. In some examples, the product may comprise at least one of a perfume and a cologne.

In another aspect, the device may be configured to alter the spray duration over a range of from about 1 second to about 45 seconds. For example, the device may be configured to alter the spray duration over a range of from about 2 seconds to about 10 seconds.

In a further aspect, the dispensing end-piece may be mounted, for example, on the reservoir via one of snap-fastening and screw-fastening. Thus, when the reservoir is empty, such a dispensing end-piece may be removed so as to refill the reservoir in order to reuse the device. Alternatively, an intermediate element may be provided between the reservoir and the dispensing end-piece. The intermediate element may be mounted on the reservoir (e.g., by snap-fastening and/or screw-fastening). The dispensing end-piece may be mounted on the intermediate element, for example, by bonding and/or welding (e.g., by applying heat).

In an additional aspect, the reservoir may define an interior volume in an undeformed state ranging from about 0.2 milliliter to about 15 milliliters. According to another aspect, the reservoir may define an interior volume in an undeformed state ranging from about 0.5 milliliter to about 10 milliliters. The reservoir may define an interior volume in a deformed state ranging from about 0.17 milliliter to about 14 milliliters, for example, from about 0.4 milliliter to about 9 milliliters. For example, the difference between an interior volume of the reservoir in an undeformed state and a deformed state may range from about 0.01 milliliter to about 2.25 milliliters, for example, from about 5% to about 15% of the interior volume of the reservoir in the undeformed state.

In another aspect, the device may be configured to provide an atomizing spray of the product from the spray orifice.

In still a further aspect, a portion of the reservoir opposite the deformable zone may define a substantially planar surface. In addition, the device may define a substantially tear-drop shape. At least a portion of the reservoir may be one of at least partially transparent and at least partially translucent, and/or the reservoir may include at least one substance imparting a color to the reservoir.

According to another aspect, the reservoir may include a first portion including a deformable zone and at least one other portion. In one embodiment of a device having such a configuration, when the threshold pressure $P_s$ is exerted on the first portion and the other portion, substantially only the deformable zone may deflect.

In an additional aspect, a method of dispensing a product may include providing the device for dispensing, and exerting the threshold pressure $P_s$ on the deformable zone so as to spray the product from the spray orifice. The product may include at least one of a cosmetic product and a care product. In another aspect, the method may also include directing spray of the product toward a body region (e.g., the skin, an article of clothing on the skin, and/or hair). The product may include at least one component imparting a scent to the product. For example, the product may include at least one of a perfume and a cologne. According to an additional aspect, the spraying of the product may occur for a predetermined duration of time. In still another aspect, the spraying may occur until the pressure exerted on the deformable zone drops below the threshold pressure $P_s$. The volume of the product sprayed may range from about 0.01 milliliter to about 1 milliliter.

The term "providing" is used in a broad sense, and refers to, but is not limited to, making available for use, enabling usage, giving, supplying, obtaining, getting a hold of, acquiring, purchasing, selling, distributing, possessing, making ready for use, and/or placing in a position ready for use.

Aside from the structural and procedural arrangements set forth above, the invention could include a number of other arrangements, such as those explained hereinafter. It is to be understood, that both the foregoing description and the following description are exemplary.

BRIEF DESCRIPTION OF THE DRAWINGS

The accompanying drawings are incorporated in and constitute a part of this specification. The drawings illustrate exemplary embodiments of the invention and, together with the description, serve to explain some principles of the invention. In the drawings, FIG. 1 is a perspective view of an embodiment of a device for dispensing a fluid product;

FIG. 2 is a schematic cross-section view of the device of FIG. 1;

FIG. 4 is a schematic cross-section view of another embodiment of a device for dispensing a fluid product;

FIG. 5 is a cross-section view taken along line V—V of FIG. 4; and

FIG. 6 is a schematic cross-section view of another embodiment of a dispensing end-piece.

DESCRIPTION OF EMBODIMENTS

Figure 3:
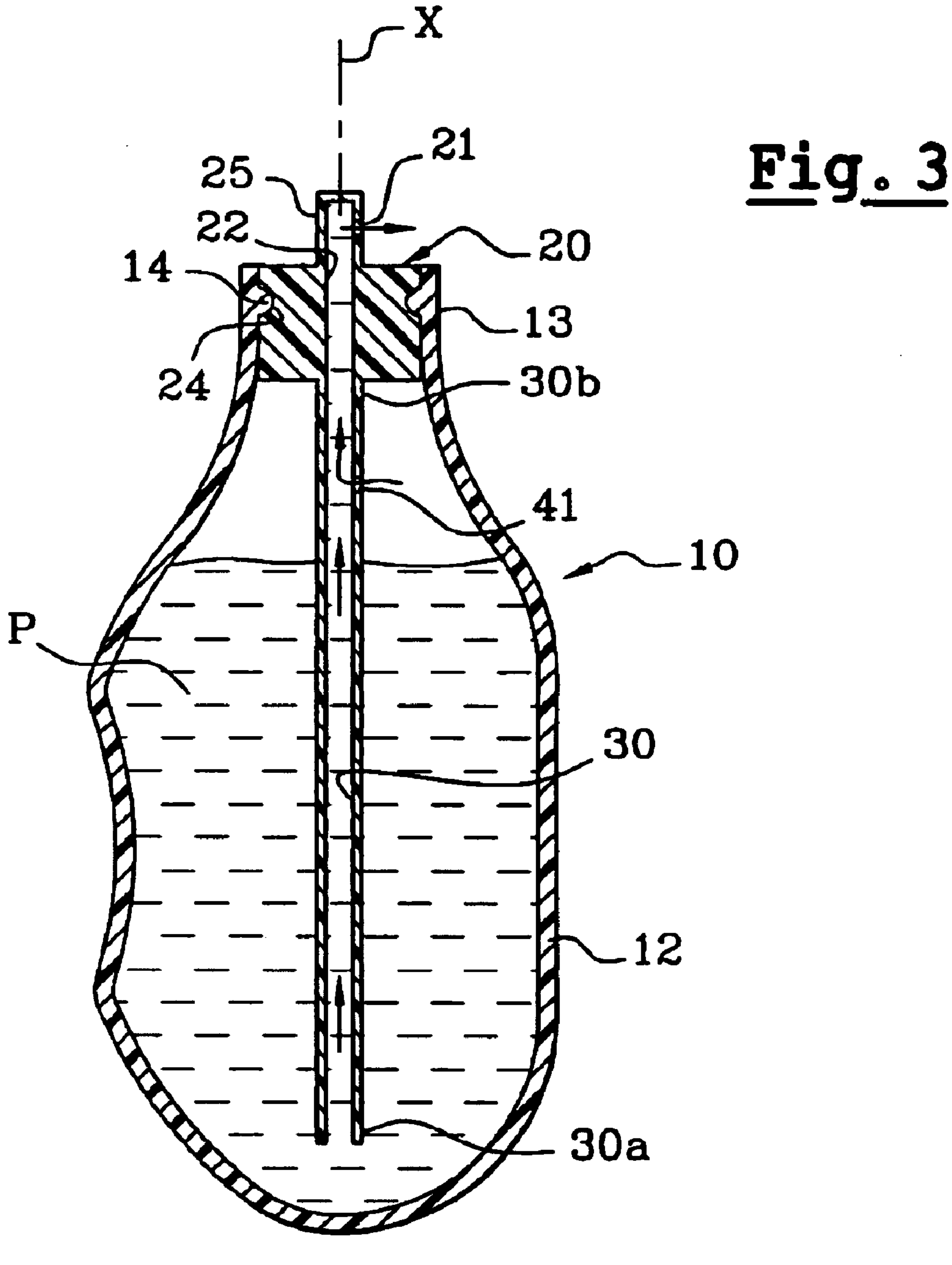
FIG. 3 is a schematic cross-section view of the device of FIG. 1 when subjected to a pressure.

Reference will now be made in detail to some possible embodiments of the invention, examples of which are illustrated in the accompanying drawings. Wherever possible, the same reference numbers are used in the drawings and the description to refer to the same or like parts.

The device depicted in FIGS. 1–3 includes a reservoir 10 (e.g., a deformable-walled reservoir) for containing the product P to be dispensed and air. Mounted on the reservoir 10, there may be a dispensing end-piece 20, which may include, for example, a spray orifice 21 in communication with the inside of the reservoir 10 via a dip tube 30. In such an exemplary embodiment, by exerting pressure on a portion of a wall of the reservoir 10, an overpressure may be created inside the reservoir 10 which may cause the product to be sprayed from the spray orifice 21 via the dip tube.

According to the embodiment depicted in FIGS. 1–3, the reservoir 10 may be configured in the form of a tear-drop, although the reservoir 10 may have any other shape allowing at least a portion of one of its at least one walls to be deformed. The reservoir may be formed, for example, by molding, such as by injection blow-molding. For example, the reservoir 10 may be formed as a single piece of a thermoplastic material (e.g., the reservoir may be formed of at least one of polyethylenes, polypropylenes, polyethylene terephthalates, polyethylene naphthalates, polyacrylonitriles, polyoxymethylenes, and polyvinyl chlorides).

The reservoir 10 may be provided with a deformable zone 11, for example, having a bulging shape, which may be deformed when pressure is applied thereto. The deformable zone 11 may have shape memory so that the deformable zone 11 may be able to revert to an initial position when the pressure exerted ceases. In another portion of the reservoir 10 (e.g., opposite the deformable zone 11), the reservoir 10 may have a wall 12 that is substantially flat, although walls having other configurations are possible and are contemplated. Such a configuration of the reservoir 10 may render it easier to identify a zone on which the user may apply pressure so that the operation of the device may be more readily apparent. This exemplary configuration may also allow a user of the device to easily grasp the device, for example, between two fingers, with a user placing the thumb on the wall 12 and the index finger on the deformable zone 11, or vice versa. A user may thus exert pressure on the deformable zone 11 using his/her index finger or thumb, for example, thereby possibly spraying the product P more easily.

The reservoir 10 may terminate in an open neck 13 into which the dispensing end-piece 20 may be mounted (e.g., in a sealed manner). The dispensing end-piece 20 may comprise, for example, an annular groove 24 configured to collaborate with a projection 14 (e.g., an annular projection) formed on the interior wall of the neck 13 of the reservoir 10. In the exemplary embodiment shown, the dip tube 30 has a axis X, and may be formed as a single piece with the dispensing end-piece 20. The dispensing end-piece 20 and the dip tube 30 may be formed, for example, by molding a single piece of a thermoplastic, such as polyethylene or polypropylene. The first end 30*a* of the dip tube 30 may open approximately toward the bottom of the reservoir 10, for example, so as to be immersed in the product P that is intended to be sprayed. The second end 30*b* of the dip tube 30 may comprise, at least in part, a duct 22 formed within the dispensing end-piece 20. The duct 22 may continue the conduit of the dip tube 30 as far as a spray orifice 21. The duct 22 may be formed along the axis X of the dip tube 30 and may extend beyond the neck 13 of the reservoir 10, ending in, for example, a cylindrical spray head 25 in which the spray orifice 21 may be formed. The spray orifice 21 may be formed in a lateral wall of the spray head 25, along an axis perpendicular to the axis X of the dip tube 30.

An orifice 41 may be formed in the lateral wall of the dip tube 30, substantially adjacent the second end 30*b*, for example, just below the dispensing end-piece 20. The air present in the reservoir 20 above the product P that is intended to be sprayed may, when compressed, enter the dip tube 30 via the orifice 41 at substantially the same time the product P rises up the dip tube 30, for example, as shown in FIG. 3.

FIG. 4 depicts another exemplary embodiment of the device. According to this embodiment, the reservoir 10 may terminate in an open neck 13, which may be provided with threading on its exterior surface, and the dispensing end-piece 20 may be threaded onto the neck 13 of the reservoir 10. The dispensing end-piece 20 may be configured such that it provides a continuation of an exterior wall of the reservoir 10, for example, so as to form the end of a tear-drop. The remainder of the reservoir 10 may be identical to the one which has just been described in accordance with FIGS. 1 through 3, although numerous alternative configurations are contemplated.

In the embodiment shown in FIG. 4, the dispensing end-piece 20 may be provided with a fixing skirt 26 (e.g., a fixing skirt threaded on its interior surface such that it may cooperate with the neck 13 of the reservoir 10). A sealing skirt 27, for example, a cylindrical sealing skirt, may be provided in order to seal the opening of the neck 13 from the dispensing end-piece 20 by becoming housed inside the neck 13 of the reservoir 10. A cavity 23 (e.g., a cylindrical cavity) may be provided in the dispensing end-piece 20 for receiving, for example, in a force-fitted manner, the second end 30*b* of the dip tube 30. The duct 22 (i.e., the duct rendering the dip tube 30 in flow communication with the spray orifice 21) may open into the bottom of the cavity 23. The duct 22 may include a portion 22*a* formed along the axis X of the dip tube 30, and a portion 22*b* that may be angularly offset from the axis X (e.g., perpendicular to the axis X). The portion 22*b* may open into the spray orifice 21. Alternatively, the duct 22 may be formed substantially entirely along the axis X, (e.g., as shown in the embodiment of the dispensing end-piece 20 shown in FIG. 6) so as to generate a spray in a direction along the axis X.

A groove 42 may be formed on a wall of the cavity 23 over substantially its entire axial height. The groove 42 may extend into the bottom of the cavity 23 so as to open between the open end of the dip tube 30 and the duct 22. At least a second groove 42, for example, a groove diametrically opposite the first groove, may be formed on the wall of the cavity 23. The groove(s) 42 may extend into the bottom of the cavity 23 over the entire cross section of the cavity 23. The groove(s) 42 may be provided so as to allow air into the product P from the dip tube 30 prior to spraying.

In the embodiments shown in the drawings, the reservoir 10 may be configured in such a way as to generate a good quality spray. For example, the deformable zone 11 may be provided with a predetermined threshold resistance to deformation below which the deformable zone 11 may deform slightly, and beyond which, the deformable zone 11 may deform suddenly, exhibiting, for example, a concave profile, as shown in FIG. 3. This predetermined threshold resistance to deformation may be determined, for example, according to the geometry of the deformable zone 11, according to the characteristics of the material used to form the deformable zone 11, and/or according to the thickness of the deformable zone 11. For example, the reservoir 10 may change from a first convex position (e.g., a position corresponding to an undeformed position), to a second concave position (e.g., corresponding to a deformed position). This second position may be predetermined, for example, according to the geometry of the deformable zone 11. The geometry of the deformable zone 11 may be such that the pressure to be exerted and/or the pressure needed to maintain a deformed position, may be below the threshold pressure $P_s$ needed to overcome the threshold of resistance to deformation. In such cases, the user may not tend to exert a greater pressure on the deformable zone 11 after it has reached its deformed position (e.g., its deformed concave position). This may result in the second predetermined position being substantially the same each time the threshold pressure $P_s$ is exerted on the deformable zone 11. As a result, for a given reservoir 10, it may be easy to determine the deformable volume (i.e., the difference in volume between the undeformed position and the predetermined deformed position). Furthermore, the remainder of the reservoir 10 may remain substantially undeformed, such that when the deformable zone 11 is deformed, the interior volume of the reservoir 10 decreases. The air present in the reservoir 10 is then compressed and an overpressure condition is created in the reservoir 10. The overpressure is created very suddenly as the threshold resistance to deformation is exceeded, and the product P is suddenly driven into the dip tube 30 via its end 30*a*. At substantially the same time, air enters it the dip tube 30 via the orifice 41 and/or the groove(s) 42 so that a product-air mixture is formed in the dip tube 30 and/or in the duct 22. The mixture obtained is then sprayed through the orifice 21.

When the deformable zone 11 reverts to its initial shape, for example, air may enter the reservoir 10 via the spray orifice 21 and/or another passage capable of allowing air to enter the reservoir 10. If any product remains inside the reservoir 10, an overpressure may be created once again by deforming the deformable zone 11 and thus another dose of product may be sprayed.

In order to obtain a significant maximum spraying time for continuous exertion of pressure on the deformable zone 11 allowing the user to alter the spraying time, the mean throughput of the spray orifice 21 may be chosen, for example, according to the configuration of the reservoir 10 and/or according to the viscosity of the product P that is to be sprayed.

For a given reservoir 10, the total volume of product P that can be expelled from the reservoir 10 in the deformed position of the deformable zone 11 may be determined because the volume depends on the viscosity of the product P and on the maximum overpressure to which it is subjected in the deformed position. For example, the more viscous the product P, the higher the overpressure needed to spray it. Furthermore, the overpressure inside the container may be at a maximum at the start of use of the device 10 (e.g., when the reservoir 10 contains little air). After several uses, for example, the reservoir 10 may contain increasing amounts of air, which may be compressed as the volume of the reservoir 10 decreases. The overpressure generated by the change of the deformable zone 11 to the deformed position may therefore be reduced. The maximum overpressure may be determined as a function of the deformable volume of the reservoir 10, which may be determined, for example, as previously explained herein. For example, if it is desirable for a maximum volume to be able to be sprayed for N seconds, then a spray orifice 21 having a mean throughput less than or equal to the ratio between the maximum volume of product and N may be selected. During these N seconds, if the user releases the pressure exerted on the deformable zone 11 in order to maintain the deformed state (e.g., the concave position), the reservoir 10 reverts to its initial volume and air enters the reservoir 10 through the spray orifice 21. The product P may then no longer be subjected to an overpressure and spraying stops.

According to one exemplary embodiment, a reservoir 10 may be formed of, for example, polyethylene terephthalate (PET). The reservoir 10 may include an deformable zone 11, which, in an undeformed position, may have a convex profile that becomes concave in a deformed position. The deformable zone 11 in the undeformed position may be substantially a portion of a sphere that has a radius of curvature, for example, of about 50 millimeters. The deformable zone 11 may have a thickness of about 0.3 millimeter. In an undeformed state, the reservoir 10 may have a volume, for example, of about 7.5 milliliters, while having a deformable volume, for example, of about 0.5 milliliter. In such a case, when the deformable zone 11 is in the concave position, the volume of the reservoir 10 is about 7.0 milliliters. If the device is desired to spray (e.g., spray water) for about 5 seconds, for example, then a spray orifice 21 may be chosen that has a mean throughput of about 0.1 milliliter. The user may thus spray the product P, for example, by exerting continuous pressure on the deformable zone 11, for about 5 seconds. However, the user could also spray the product P for a shorter time, for example, for two, three, or four seconds, by releasing the pressure.

The device according to some exemplary embodiments of the invention may be used to dispense any cosmetic or care products, such as make-up, perfume, cologne, dermatological substance, or pharmaceutical compositions used for treating and/or changing the appearance and/or scent of hair or skin. However, in its broadest aspects, the present invention could be used to dispense many other substances.

Furthermore, sizes of various structural parts and materials used to make the above-mentioned parts are illustrative and exemplary only, and one of ordinary skill in the art would recognize that these sizes and materials can be changed as necessary to produce different effects or desired characteristics.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A device for dispensing a fluid product, the device comprising:

a reservoir configured to contain a fluid product and air, the reservoir defining an internal volume and comprising at least one deformable zone having a predetermined threshold resistance to deformation such that deformation of the at least one deformable zone does not depend linearly on pressure exerted thereon;

a spray orifice; and a dip tube comprising a first end located adjacent a bottom of the reservoir, and a second end being in flow communication with the spray orifice, wherein the deformable zone is configured to deform suddenly in response to pressure exerted on the deformable zone, thereby creating a sudden overpressure condition inside the reservoir so as to cause the product to be sprayed out from the orifice, and wherein the deformable zone is configured so that when pressure exerted on the deformable zone is less than a threshold pressure $P_s$ sufficient to overcome the predetermined threshold resistance to deformation of the deformable zone, the internal volume of the reservoir is not substantially reduced.

2. The device of claim 1, further comprising a duct, wherein the second end of the dip tube is in flow communication with the spray orifice via the duct.

3. The device of claim 2, further comprising a dispensing end-piece attached to the reservoir, wherein the dispensing end-piece comprises the spray orifice and the duct.

4. The device of claim 3, wherein the dispensing end-piece defines a cavity and the second end of the dip tube is fixedly mounted in the cavity.

5. The device of claim 3, wherein the dip tube and the dispensing end-piece are unitarily formed.

6. The device of claim 3, further comprising an air passage formed in the dispensing end-piece.

7. The device of claim 3, wherein the dispensing end-piece is mounted on the reservoir via one of snap-fastening and screw-fastening.

8. The device of claim 2, further comprising an air passage opening into the duct and the reservoir.

9. The device of claim 8, wherein the air passage opens into the duct at the second end of the dip tube.

10. The device of claim 9, further comprising a dispensing end-piece attached to the reservoir, the dispensing end-piece defining a cavity wall, wherein the air passage comprises at least one groove formed in the cavity wall.

11. The device of claim 1, further comprising an air passage configured to permit at least a portion of the air in the reservoir to mix, adjacent the second end of the dip tube, with product conveyed by the dip tube.

12. The device of claim 11, wherein the air passage is defined by an orifice provided in a lateral wall of the dip tube adjacent to the second end of the dip tube.

13. The device of claim 1, wherein the dip tube defines an axis and the spray orifice is formed along the axis.

14. The device of claim 1, wherein the dip tube defines an axis and the spray orifice is angularly offset from the axis.

15. The device of claim 1, the deformable zone is configured to revert to its initial shape via elastic return when the pressure exerted on the deformable zone ceases.

16. The device of claim 15, wherein the deformable zone is configured to be deformed from an undeformed position to a deformed position, and wherein the deformable zone has a substantially convex profile in its undeformed position and a substantially concave profile in its deformed position, the deformed position occurring when the pressure exerted on the deformable zone reaches the threshold pressure $P_s$.

17. The device of claim 1, wherein the deformable zone of the reservoir is formed of thermoplastic material.

18. The device of claim 17, wherein the thermoplastic material is selected from polyethylenes, polypropylenes, polyethylene terephthalates, polyethylene naphthalates, polyacrylonitriles, polyoxymethylenes, and polyvinyl chlorides.

19. The device of claim 1, wherein the device is configured to contain a sample dose of at least one of a cosmetic product and a care product.

20. The device of claim 1, wherein the device is configured to alter the spray duration over a range of from about 1 second to about 45 seconds.

21. The device of claim 1, wherein the device is configured to alter the spray duration over a range of from about 2 seconds to about 10 seconds.

22. The device of claim 1, wherein the reservoir defines an interior volume in an undeformed state ranging from about 0.2 milliliter to about 15 milliliters.

23. The device of claim 1, wherein the reservoir defines an interior volume in a deformed state ranging from about 0.17 milliliter to about 14 milliliters.

24. The device of claim 1, wherein the difference between an interior volume of the reservoir in an undeformed state and a deformed state ranges from about 0.01 milliliter to about 2.25 milliliters.

25. The device of claim 1, wherein the difference between an interior volume of the reservoir in an undeformed state and a deformed state ranges from about 5% to about 15% of the interior volume of the reservoir in the undeformed state.

26. The device of claim 1, wherein the device is configured to provide an atomizing spray of the product from the spray orifice.

27. The device of claim 1, wherein a portion of the reservoir opposite the deformation zone defines a substantially planar surface.

28. The device of claim 1, wherein the device defines a substantially tear-drop shape.

29. The device of claim 1, wherein at least a portion of the reservoir is one of at least partially transparent and at least partially translucent.

30. The device of claim 1, wherein the reservoir comprises at least one substance imparting a color to the reservoir.

31. The device of claim 1, wherein the reservoir comprises a first portion comprising the deformable zone and at least one other portion, and wherein when the threshold pressure $P_s$ is exerted on the first portion and the other portion, substantially only the deformable zone deflects.

32. The device of claim 1, further comprising a fluid product contained in the reservoir.

33. The device of claim 32, wherein, at least prior to a first use of the device, the product has a volume ranging from about 0.5 milliliter to about 15 milliliters.

34. The device of claim 32, wherein the product comprises at least one of a cosmetic product and a care product.

35. The device of claim 32, wherein the product comprises at least one component imparting a scent to the product.

36. The device of claim 35, wherein the product comprises at least one of a perfume and a cologne.

37. A method of dispensing a product, the method comprising:

providing the device for dispensing of claim 32; and exerting the threshold pressure $P_s$ on the deformable zone so as to spray the product from the spray orifice.

38. The method of claim 37, wherein the product comprises at least one of a cosmetic product and a care product.

39. The method of claim 38, further comprising directing spray of the product toward a body region.

40. The method of claim 37, wherein the product comprises at least one component imparting a scent to the product.

41. The method of clam 37, wherein the product comprises at least one of a perfume and a cologne.

42. The method of claim 37, wherein the spraying of the product occurs for a predetermined duration of time.

43. The method of claim 37, wherein the spraying occurs until the pressure exerted on the deformable zone drops below the threshold pressure $P_s$.

44. The method of claim 37, wherein the exerting the threshold pressure $P_s$ results in the reservoir changing from an undeformed state to a deformed state, wherein the difference between an interior volume of the reservoir in the undeformed state and the deformed state ranges from about 0.01 milliliter to about 2.25 milliliters.

45. The method of claim 37, wherein the exerting the threshold pressure $P_s$ results in the reservoir changing from an undeformed state to a deformed state, wherein the difference between an interior volume of the reservoir in the undeformed state and the deformed state ranges from about 5% to about 15% of the interior volume of the reservoir in the undeformed state.

46. The method of claim 37, wherein the volume of the product sprayed ranges from about 0.01 milliliter to about 2.25 milliliters.

47. The device of claim 1, wherein the device is configured so that exerting of at least the threshold pressure $P_s$ on the deformable zone causes the deformable zone to deform suddenly, thereby creating an overpressure condition within the reservoir.

* * * * *

UNITED STATES PATENT AND TRADEMARK OFFICE

CERTIFICATE OF CORRECTION

PATENT NO. : 6,860,404 B2 
DATED : March 1, 2005
INVENTOR(S) : Florent Duqueroie It is certified that error appears in the above-identified patent and that said Letters Patent is hereby corrected as shown below:

Column 10,
Line 36, insert -- wherein -- after "claim 1,".

Signed and Sealed this

Seventeenth Day of May, 2005

JON W. DUDAS
*Director of the United States Patent and Trademark Office*